United States Patent [19]

Terada et al.

[11] Patent Number: 5,777,780
[45] Date of Patent: Jul. 7, 1998

[54] ELECTROCHROMIC DEVICE AND METHOD FOR MANUFACTURING THE SAME

[75] Inventors: Junji Terada, Hiratsuka; Shigeru Hashimoto, Yokohama, both of Japan

[73] Assignee: Canon Kabushiki Kaisha, Tokyo, Japan

[21] Appl. No.: 705,295

[22] Filed: Aug. 29, 1996

[30] Foreign Application Priority Data

Aug. 30, 1995 [JP] Japan .................................. 7-243889
Sep. 12, 1995 [JP] Japan .................................. 7-258293

[51] Int. Cl.$^6$ .................................................. G02F 1/153
[52] U.S. Cl. ........................ 359/273; 359/250; 359/254; 359/271
[58] Field of Search ............................ 359/273, 250, 359/254, 271; 350/357

[56] References Cited

U.S. PATENT DOCUMENTS 3,521,941  7/1970  Deb et al. ........................ 350/160
4,350,414  9/1982  Takahashi et al. ............... 350/357

FOREIGN PATENT DOCUMENTS 60-31355    7/1985   Japan ................. C09K 9/00
63-294536  12/1988   Japan ................. G02F 1/17
4-35735     6/1992   Japan ................. G02F 1/161

Primary Examiner—Frank G. Font
Assistant Examiner—Reginald A. Ratliff
Attorney, Agent, or Firm—Fitzpatrick, Cella, Harper & Scinto

[57] ABSTRACT

There is provided an electrochromic device comprising a pair of transparent substrates facing each other, a pair of transparent electrodes facing each other between the pair of transparent substrates, and an electrochromic layer and a transparent ion conductive layer sandwiched by the pair of transparent electrodes, wherein at least the electrochromic layer and the transparent ion conductive layer are coated with a resin in a state that carrier precursor in the electrochromic layer and in the transparent ion conductive layer is ionized. As a result, film breakage of the electrochromic device and peeling off of the sealing resin and the sealing substrate are prevented, thus improving the durability of the electrochromic device.

11 Claims, 2 Drawing Sheets

ELECTROCHROMIC DEVICE AND METHOD FOR MANUFACTURING THE SAME

BACKGROUND OF THE INVENTION

1. Field of the Invention

The present invention relates to an electrochromic device and a method for manufacturing the same, which device is used for a display device, a transmittance-variable filter, etc.

2. Related Background Art

Application of an electrochromic device (hereinafter referred to simply as "EC device"), colored or colorless (approximately transparent), corresponding to an applied electrical field to a display device, a transmittance-variable filter, etc. has been investigated, because the EC device, compared with ordinary liquid crystal devices and the like, has high optical transmittance in a colorless state, is unaffected by polarization, and exhibits a memory effect.

As an EC device of entirely solid type, there is known by, for example, U.S. Pat. No. 3,521,941 a four-layered structure device in which an a-$WO_3$ film, an insulating layer such as $SiO_2$ or $CaF_2$, and an Au electrode are successively stacked on Nesa glass ($SnO_2$: transparent electrode). Also, Japanese Patent Publication No. 60-31355 and U.S. Pat. No. 4,350,414, etc. disclose a five-layered structure EC device in which an $In_2O_3$ transparent electrode, an oxidative coloring EC layer consisting of $Ir(OH)_x$, a transparent ion conductive layer (solid electrolyte layer) consisting of $Ta_2O_5$, a reductive coloring EC layer consisting of $WO_3$, and an $In_2O_3$ transparent electrode are successively formed on a transparent substrate such as glass, to thereby improve speed of response and repeated durability (i.e. durability under driving condition).

It is known that these EC devices are apt to be affected by ambient humidity and show no coloring/bleaching at all particularly in a vacuum, as described in S.K. Deb: Phil. Mag. 27 (1973) 801., Matsuhisa and Masuda: Shinku (Vacuum), vol. 11 (1980), pp. 503–514, and Japanese Patent Publication No. 4-35735.

To improve the durability of the EC device by preventing it from being affected by ambient humidity, there is disclosed a technique of sealing an EC device using a sealing substrate such as a glass substrate and a sealing resin such as epoxy resin in Japanese Patent Publication No. 4-35735, Japanese Patent Application Laid-Open No. 63-294536, etc.

The above-described Japanese Patent Publication No. 4-35735 also discloses that an EC device is sealed after confirming that the EC material contains 10–30 vol. % of water to prevent generation of irregular coloring after sealing and lowering of performance after weathering resistance test.

However, the above-described devices have a problem that repeated coloring and loss of color generates gas in the EC device, whereby volume expansion of the EC device is caused to induce film breakage of the EC device and peeling off of the sealing resin or the sealing substrate, followed by deterioration of external appearance (scattering of light).

The coloring and loss of color reactions in the above-described four-layered structure EC device comprising a $WO_3$ layer and an insulating layer are presumably expressed by the following formulae:

(1) Coloring reactions $$2nH_2O \rightarrow 2nH^+ + 2nOH^-$$

$$2WO_3 + 2nH^+ + 2ne^- \rightarrow 2H_nWO_3$$

$$2nOH^{31} \rightarrow nH_2O + (\tfrac{1}{2})nO_2\uparrow + 2ne^{31}$$

(2) Loss of color reactions $$2H_nWO_3 \rightarrow 2WO_3 + 2nH^+ + 2ne^-$$

$$2nH^+ + 2ne^- \uparrow nH_2\uparrow$$

Further, the coloring and loss of color reactions in the above-described five-layered structure EC device comprising an $Ir(OH)_x$ layer further added to the $WO_3$ layer and the insulating layer are presumably expressed by the following formulae:

(3) Coloring reactions $$nH_2O \rightarrow nH^+ + nOH^-$$

$$WO_3 + nH^+ + ne^- \rightarrow H_nWO_3$$

$$nOH^- + Ir(OH)_x \rightarrow Ir(OH)_{n+x} + ne^-$$

(4) Loss of color reactions $$H_nWO_3 \rightarrow WO_3 + nH^+ + ne^-$$

$$Ir(OH)_{n+x} + ne^- \rightarrow nOH^- + Ir(OH)_x$$

$$nH^+ + nOH^- \rightarrow nH_2O\uparrow$$

Formulae (1) and (2) show that the EC device of four-layered structure generates oxygen gas and hydrogen gas in the coloring and loss of color reactions. Formulae (3) and (4) represent that in the EC device of five-layered structure, the decomposition and re-composition of water occur in a reversible fashion, and that coloring and loss of color are repeated while no oxygen gas nor hydrogen gas generates. The $H_2O$ in the above formulae exists mainly in the transparent ion conductive layer and dissociates into $H^+$ and $OH^{31}$ by application of an electric field. These $H^+$ and $OH^-$ are substances which conduct charge transfer through the transparent ion conductive layer, i.e., carrier. Accordingly, the above mentioned $H_2O$ can be regarded as a carrier precursor. To sustain such reversible reactions, a balance is necessary to be kept between the amount of substance (mainly, reductive coloring EC substance, e.g., $WO_3$) in the reductive coloring EC layer capable of reacting with $H^+$ions and the amount of substances (mainly, oxidative coloring EC substance, e.g., $Ir(OH)_x$) in the oxidative coloring EC layer capable of reacting with $OH^-$ions.

However, even in the above-described five-layered EC device, when coloring and loss of color are repeated, the balance between the reacted amount of substance in the reductive coloring EC layer and the reacted amount of substance in the oxidative coloring EC layer will be lost, thereby generating oxygen gas and/or hydrogen gas.

Further, when a plurality of EC devices are manufactured using the method described in Japanese Patent Publication No. 4-35735 in which sealing is carried out after incorporating water into the EC material, there arises a problem that a slight difference in the manufacturing conditions (such as manufacturing atmosphere) for the respective EC devices causes differences in the coloring speed and speed of loss of color, and in the amount of change in coloring concentration.

SUMMARY OF THE INVENTION

The present invention has been accomplished in view of the above described circumstances, and an object of the present invention is to provide an EC device that is free from problems such as film breakage of EC device, peeling off of a sealing resin or a sealing substrate, and deterioration of external appearance, resulting from repeated coloring and loss of color, irrespective of the layer-structure of the EC device.

Further, another object of the present invention is to provide an EC device that exhibits a good repeatability of specified coloring speed and speed of loss of color and amount of change in coloring concentration (or contrast) after sealing.

In addition, still another object of the present invention is to provide an EC device that has excellent repeated durability and exhibits stable coloring speed and speed of loss of color, and stable amount of change in coloring concentration.

To attain the above-described objects, according to the present invention, there is provided an electrochromic device comprising a pair of transparent substrates facing each other, a pair of transparent electrodes facing each other between the pair of transparent substrates, and an electrochromic layer and a transparent ion conductive layer sandwiched by the pair of transparent electrodes, wherein at least the electrochromic layer and the transparent ion conductive layer are coated with a resin having a Young's modulus of 8–60 Kgf/cm².

Further, according to the present invention, there is provided an electrochromic device comprising a pair of transparent substrates facing each other, a pair of transparent electrodes facing each other between the pair of transparent substrates, and an electrochromic layer and a transparent ion conductive layer sandwiched by the pair of transparent electrodes, wherein at least the electrochromic layer and the transparent ion conductive layer are coated with a resin in a state that a carrier precursor in the electrochromic layer and in the transparent ion conductive layer is ionized.

Furthermore, according to the present invention, there is provided a method for manufacturing an electrochromic device comprising a pair of transparent substrates facing each other, a pair of transparent electrodes facing each other between the pair of transparent substrates, and an electrochromic layer and a transparent ion conductive layer sandwiched by the pair of transparent electrodes, the method comprising coating at least the electrochromic layer and the transparent ion conductive layer with a resin having a Young's modulus of 8–60 Kgf/cm².

Still further, according to the present invention, there is provided a method for manufacturing an electrochromic device comprising a pair of transparent substrates facing each other, a pair of transparent electrodes facing each other between the pair of transparent substrates, and an electrochromic layer and a transparent ion conductive layer sandwiched by the pair of transparent electrodes, the method comprising coating at least the electrochromic layer and the transparent ion conductive layer with a resin in a state that a carrier precursor in the electrochromic layer and in the transparent ion conductive layer is ionized.

DESCRIPTION OF THE PREFERRED EMBODIMENTS

Now the description is made of the preferred embodiments of the EC device according to the present invention with reference to the drawings.

Figure 1:
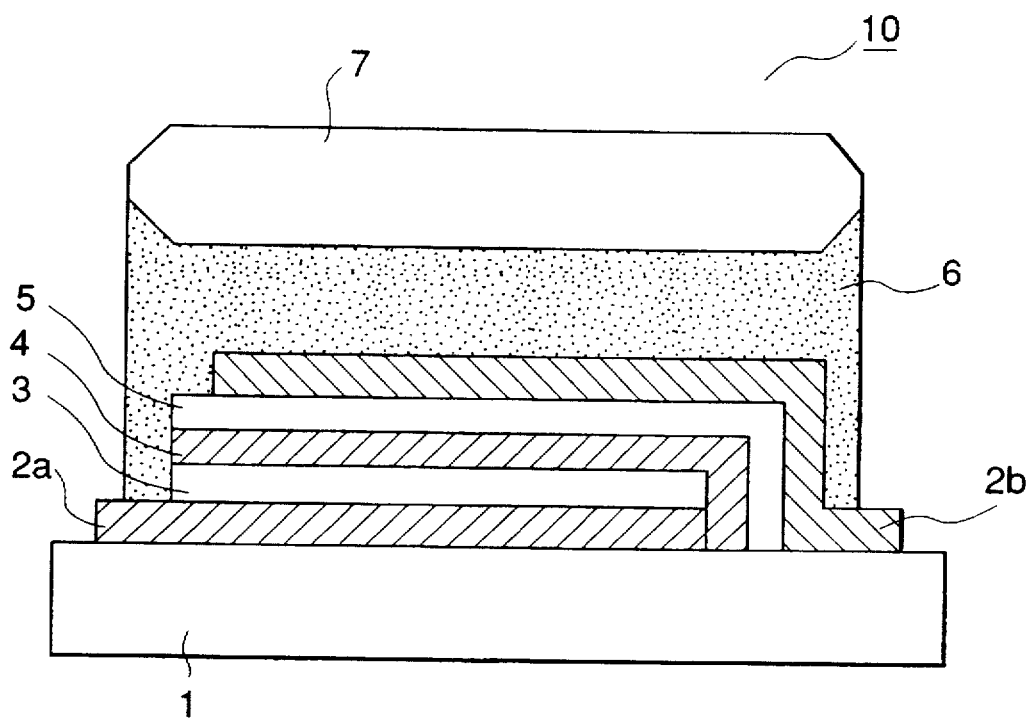
FIG. 1 is a schematic cross sectional view showing an example of the EC device according to the present invention.

FIG. 1 is a schematic cross sectional view showing an example of the EC device of the present invention. The EC device according to a preferred embodiment of the invention is constituted of a five-layered structure in which, on a transparent substrate 1, a transparent electrode (transparent electroconductive layer) 2a, an oxidative coloring EC layer 3, a transparent ion conductive layer (solid electrolyte layer) 4, a reductive coloring EC layer 5, and a transparent electrode (transparent electroconductive layer) 2b are successively stacked. A transparent substrate (sealing substrate) 7 is provided so as to face the transparent electrode 2b. Between the sealing substrate 7 and the transparent electrode 2b, and at the periphery of the respective layers positioned between the transparent electrode 2a and the transparent electrode 2b, a transparent resin (sealing resin) 6 is provided. That is, the EC device 10 is sealed with the resin. The sealing resin 6 plays not only a role of bonding the transparent electrode 2b and the transparent substrate 7 but also a role of coating the respective layers of the oxidative coloring EC layer 3, the transparent ion conductive layer 4, and the reductive coloring EC layer 5 to thereby prevent these layers from being exposed to outside air. In this state, the externally connecting portions of the transparent electrodes 2a and 2b may be exposed to outside air. The externally connecting portions may be wired in a desired pattern. Also, the transparent substrates 1 and 7 play not only a role of physically protecting the EC device 10 but also a role of further reducing the affect of outside air to the EC device.

Of the above-described layers, the oxidative coloring EC layer 3 may be a layer consisting of a mixture of an oxidative coloring EC substance and a metal oxide, (hereinafter referred to simply as "mixture layer"). Alternatively, a mixture layer may be arranged between the oxidative coloring EC layer 3 and the transparent ion conductive layer 4, apart from the oxidation coloring EC layer 3, to thereby form an EC device having a six-layered structure.

As the transparent substrate 1 and the sealing substrate 7, a glass substrate is preferably used. Nevertheless, substrates of various kinds of transparent materials such as plastic may be used depending on the use of the EC device. It is preferable that the surface of the transparent substrate 1 at the side opposite to the transparent electrode 2a and a back surface of the substrate 7 facing to the transparent substrate 2b are provided with a single layer film consisting of a dielectric such as $Al_2O_3$, $TiO_2$, $MgF_2$, etc. or with a plurality of the single layer films as built up, thereby effecting the anti-reflection coating (ARC).

As the transparent electrodes 2a and 2b, there may be used $In_2O_3$, $SnO_2$, ITO (Indium Tin Oxide). However, from the point of optical characteristics (light-transmittance) and a resistance value, ITO is preferable, and an ITO consisting of $In_2O_3$ and $SnO_2$ at a rate of approximately 95:5 is more preferable.

The oxidative coloring EC layer 3 preferably contains at least one selected from the group consisting of Co, Ni, Fe, Ir, Cu, Ru, Rh, Pd, Pt, Cr, Dy, and Er. These elements exist therein as a metallic simple substance (M), its oxide ($MO_x$), its hydroxide ($M(OH)_x$), its oxyhydroxide ($MO_x(OH)_y$), or a mixture thereof. Further the oxidative coloring EC layer 3 is more preferable to be made of a substance or a mixture of two or more substances selected from the group consisting of iridium, iridium oxide, iridium hydroxide, iridium oxyhydroxide cobalt, cobalt oxide, cobalt hydroxide, cobalt oxyhydroxide, nickel, nickel oxide, nickel hydroxide, nickel oxyhydroxide, from the viewpoint of optical characteristics and repeated durability.

A preferable thickness of the oxidative coloring EC layer 3 is from 1–50 nm. When the thickness of the layer is smaller than 1 nm, the repeated durability degrades, and when the thickness is larger than 50 nm, the absorbance increases.

When a mixture layer is formed, the oxidative coloring EC substance used in the mixed layer preferably contains at least one selected from the group consisting of Co, Ni, Fe, Ir, Cu, Ru, Rh, Pd, Pt, Cr, Dy, and Er. These elements exist therein as a metallic simple substance (M), its oxide ($MO_x$), its hydroxide ($M(OH)_x$), its oxyhydroxide ($MO_x(OH)_y$), or a mixture thereof. The oxidative coloring EC substance is further preferable to be consisting of a substance or a mixture of two or more substances selected from the group consisting of iridium, iridium oxide, iridium hydroxide, iridium oxyhydroxide, cobalt, cobalt oxide, cobalt hydroxide, cobalt oxyhydroxide, nickel, nickel oxide, nickel hydroxide, nickel oxyhydroxide, from the viewpoint of optical characteristics and repeated durability.

The metal oxide used in the mixture layer is preferably the one that has a high light transmittance. The metal oxide is preferably a substance which does not exhibit reductive coloring electrochromism under application of a practical voltage. A preferred metal oxide is one of or a mixture of two or more selected from the group consisting of $TiO_2$, $Ta_2O_5$, $ZrO_2$, $HfO_2$, $Y_2O_3$, $Al_2O_3$, $SiO_2$, and $SnO_2$.

In the mixture layer, the weight ratio of the oxidative coloring EC substance to the metal oxide is preferably $0.02 \leq$ (oxidative coloring EC substance/metal oxide) $\leq 1$. When the ratio is greater than 1, the absorbance increases, and when the ratio is smaller than 0.02, the coloring speed (speed of response) reduces and the durability degrades.

A preferable thickness of the mixture layer is 10–5000 nm from the point of speed of response and light transmittance. When the layer thickness is greater than 5000 nm, the absorbance increases, and when the thickness is smaller than 10 nm, the coloring speed (speed of response) decreases and the durability degrades.

The transparent ion conductive layer (solid electrolyte layer) 4 preferably consists of one or a mixture of $Ta_2O_5$, $ZrO_2$, $SiO_2$, or $MgF_2$, and $Ta_2O_5$ is particularly preferable from the viewpoint of optical characteristics and repeated durability.

The reductive coloring EC layer 5 preferably consists of one or a mixture of $WO_3$, $MoO_3$, $Nb_2O_5$, and $WO_3$ is particularly preferable from the viewpoint of coloring speed. Further, forming the reduction coloring EC layer 5 using a mixture of $WO_3$ and $MoO_3$ can provide an EC device which becomes black on coloring.

A preferable thickness of the respective layers except for the oxidative coloring EC layer 3 and for the mixture layer is 1–5000 nm. The thickness is determined based on the required optical characteristics, repeated durability, and the like.

According to a first aspect of the present invention, the sealing resin 6 is a resin having an elasticity in terms of a Young's modulus within a range of 8–60 Kgf/cm$^2$. The Young's modulus was determined by tensile test carried out at a stress rate of 10 mm/min. A preferable sealing resin 6 is a silicone resin, an urethane resin, a modified acrylate resin, and an epoxy resin. These resins preferably have the Young's modulus in the range described above. The preferred range of Young's modulus for respective specified resins is determined by the adhesion strength of the resin and other characteristics. The preferable range of Young's modulus is 10–60 Kgf/cm$^2$ for a silicone resin, 8–34 Kgf/cm$^2$ for an urethane resin, 8–35 Kgf/cm$^2$ for a modified acrylate resin, and 10–40 Kgf/cm$^2$ for an epoxy resin.

According to the first aspect of the present invention, the above-described structure allows the sealing resin to absorb the deformation of the EC device due to volume expansion caused by gas generation induced from repeated coloring and loss of color, thereby preventing substantial damage and deterioration of external appearance. The effect is obtained by using a resin having Young's modulus within a range given above. Thus, the deterioration of characteristics of the EC device caused by sealing can be prevented.

The EC device according to the second aspect of the present invention is featured by that the carrier precursor existing in the EC device is ionized before conducting the sealing with a resin, and that the sealing with a resin is conducted in a state that the carrier precursor is ionized (i.e., in a state that the carrier precursor is converted into carriers). The term "carrier precursor" as used in the specification and claims refers to those substances which easily dissociate into cations and anions by application of an electric field and contribute to charge transfer in the transparent ion conductive layer. Taking into account the charge transfer rate, it is preferred that the carrier precursor is a substance which dissociates into small ions, such as a hydride, a Li compound and the like. As the carrier precursor, there can be specifically included $H_2O$, LiI, $Li_3N$, $Li_2WO_4$ and the like, with $H_2O$ being preferred in view of charge transfer rate and of no need of any special injecting equipment.

The carrier precursor existing in the transparent ion conductive layer 4 is ionized to form carriers, which migrate to the reduction coloring EC layer or the like. This facilitates the incorporation of the ionized substances into the transparent ion conductive layer.

Further, application of a voltage induces coloring of the respective EC layers. By monitoring the coloring density and performing the resin-sealing when a desired coloring density has been attained, it is possible to reduce the dispersion of the coloring speed and speed of loss of color and of the amount of change in coloring density (contrast) after sealing as conventionally caused by a slight difference in EC device manufacturing conditions (manufacturing atmosphere, etc.).

The EC device of the embodiment is structured by successively stacking the transparent electrode 2a, the oxidative coloring EC layer 3, the transparent ion conductive layer 4, the reductive coloring EC layer 5, and the transparent electrode 2b, on the transparent substrate 1. On the contrary, the EC device may be structured by successively stacking in the inverse order, the transparent electrode, the reductive coloring EC layer, the transparent ion conductive layer, the oxidative coloring EC layer, and the transparent electrode, on the transparent substrate.

Next, the description is made of a manufacturing method of the EC device 10 according to an embodiment of the present invention.

First, the transparent electrode (transparent electroconductive layer) 2a is formed on the transparent substrate 1 by a known film-forming method such as vacuum deposition, sputtering, ion plating, CVD, etc.

Next, the oxidative coloring EC layer 3 is formed on the transparent electrode 2a by a known film-forming method such as vacuum deposition, sputtering, ion plating, CVD, etc.

Next, the transparent ion conductive layer 4 is formed by a known film-forming method described above.

Then, the reductive coloring EC layer 5 and the transparent electrode (transparent electroconductive layer) 2b are successively formed by a known film-forming method described above.

Finally, the EC device 10 is resin-sealed using the sealing resin 6 and the sealing substrate 7.

Figure 2:
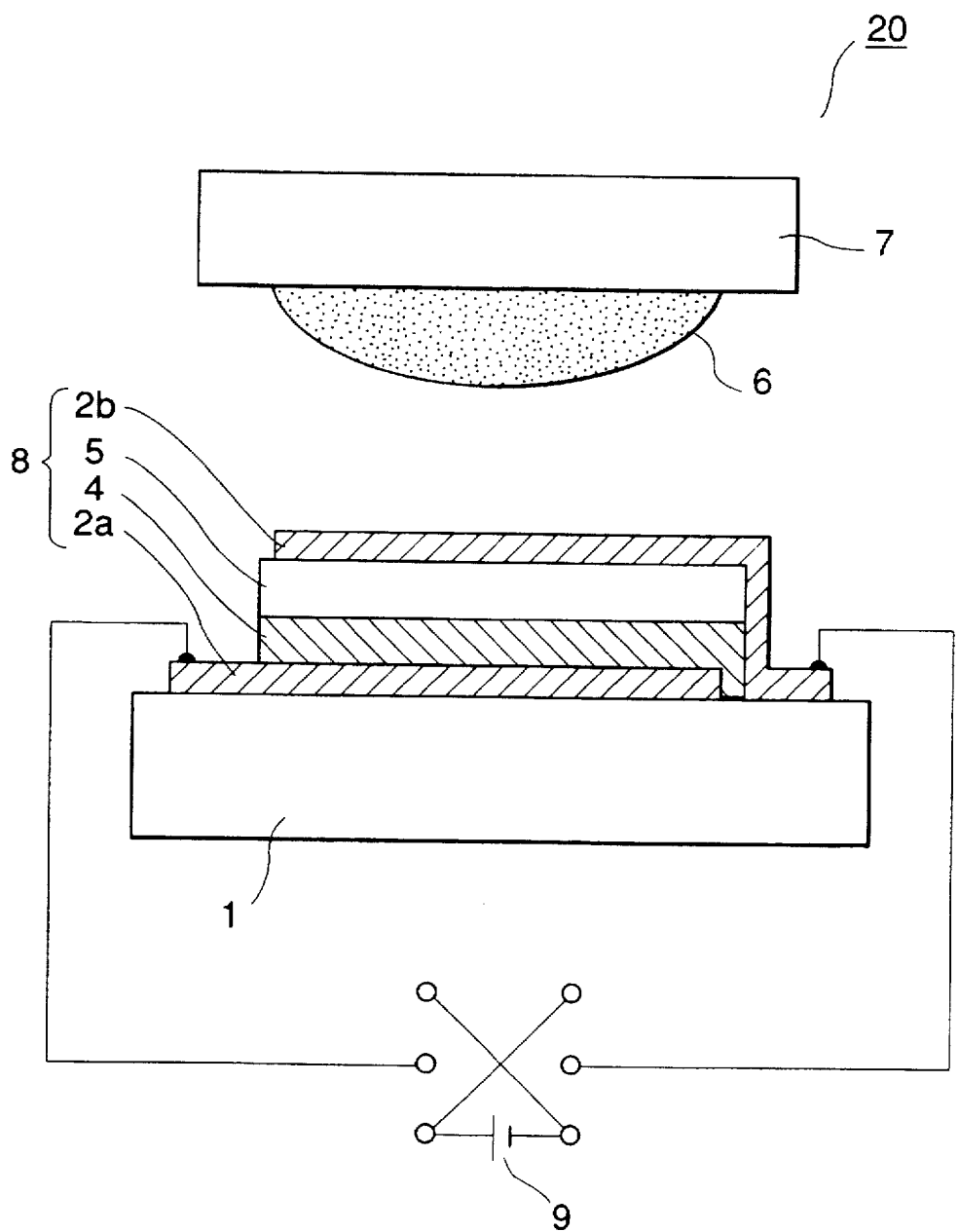
FIG. 2 is a schematic cross sectional view showing a state immediately before sealing of an example of the EC device according to the present invention.

Here, the description is made of the resin-sealing method according to the second aspect of the present invention by referring to FIG. 2.

FIG. 2 is a schematic cross sectional view showing an example of an EC device immediately before the sealing in the manufacturing process of the EC device according to the second aspect of the present invention. The same component as in FIG. 1 has the same reference numeral in FIG. 1, and the description thereof is omitted. The EC device 20 shown in FIG. 2 is a four-layered EC device having no oxidative coloring EC layer. Hereinafter, the four layers are collectively referred to as a single four-layered structure member 8. The reference numeral 9 denotes a constant voltage power source that is connected to the transparent electrodes 2a and 2b to apply a voltage between these electrodes.

In the resin-sealing method according to the second aspect of the present invention, the carrier precursor electrolyte in the four-layered structure body is ionized by applying a voltage, using the constant voltage power source 9, between the transparent electrodes 2a and 2b before conducting the resin-sealing, and, the resin-sealing is carried out under the application of voltage to form a shape similar to one as shown in FIG. 1. Specifically, by ionizing the carrier precursor while controlling the voltage applied between the electrodes so as to attain a range of color concentration within which the coloring and loss of color of the EC device 20 is reversible, and more preferably so as to further obtain a specified coloring speed (for example, a speed to give an optical density change $\Delta OD=1.0$ within 2 sec. when a voltage of 3V is applied), it is possible to stabilize the characteristics such as coloring speed and speed of loss of color after sealing and amount of change in color concentration.

Further, when water is used as the carrier precursor and ionized into $H^+$ and $OH^-$ by application of a voltage, controlling the ionizing amount and monitoring the coloring density as described above makes it possible to incorporate a necessary amount of water from the atmosphere into the EC device, especially into the transparent ion conductive layer with a good reproducibility, regardless of humidity change in the atmosphere. Thus, any special control of the sealing environment is not necessary, and an injection equipment conventionally needed when a Li compound or the like is used as the carrier precursor becomes unnecessary.

Hereinafter, the present invention will be described in more detail by employing the following Examples and Comparative Examples.

EXAMPLE 1

A glass substrate having an anti-reflection film provided on one surface was subjected to vacuum deposition of ITO on the other surface thereof under the conditions of a substrate temperature=300° C. and an $O_2$ partial pressure= $5\times10^{-2}$ Pa to form a transparent electrode (transparent electroconductive layer) having a 150 nm-thickness layer as a first layer.

Next, the transparent electrode was subjected to film formation by high frequency sputtering using a target of metallic iridium under the conditions of a substrate temperature=room temperature, a mixed gas pressure of water vapor and argon=5 Pa, and a flow rate ratio of water vapor to argon=3, thus forming an oxidative coloring EC layer having a thickness of 5 nm as a second layer. The input power applied to the metallic iridium target was 130 W. The oxidative coloring EC layer contains iridium oxide and iridium hydroxide as main components.

Next, the oxidative coloring EC layer was subjected to vacuum deposition of tantalum pentoxide under the conditions of a substrate temperature=300° C. and an $O_2$ partial pressure=$3\times10^{-2}$ Pa to form a transparent ion conductive layer having a thickness of 300 nm as a third layer.

Next, the transparent ion conductive layer was treated by vacuum deposition of tungsten trioxide under the conditions of a substrate temperature=300° C. and an $O_2$ partial pressure=$5\times10^{-2}$ Pa to form a reductive coloring EC layer having a thickness of 1000 nm as a fourth layer.

Subsequently, the reductive coloring EC layer was subjected to deposition of ITO by high frequency ion plating under the conditions of a substrate temperature=300° C., an $O_2$ partial pressure=$5\times10^{-2}$ Pa, and a high frequency power of 150 W to form a transparent electrode (transparent conductive layer) having a thickness of 450 nm as a fifth layer.

Finally, the resin-sealing was conducted using a sealing substrate and a modified acrylate resin having 10 Kgf/cm² of Young's modulus.

Following the above-described procedure, an EC device having a five-layered structure as shown in FIG. 1 was obtained.

When a voltage was applied to the transparent electrodes 2a and 2b of the device with the transparent electrode 2b being used as a negative electrode, an oxidation-reduction reaction occurred to effect coloring. When a voltage was applied to the electrodes with the transparent electrode 2b being used as a positive electrode, a reverse oxidation-reduction reaction occurred to effect loss of color.

In the EC device of this Example, repeating coloring and loss of color results in expansion of the film of the EC device due to generation of a gas. However, the sealing resin having elasticity absorbs the film expansion to suppress the breakage of the film and the peeling off of the sealing resin and the sealing substrate. In addition, the sealing resin reduces the effect of atmospheric humidity on the oxidation coloring EC layer, the transparent ion conductive layer, and the reduction coloring EC layer. The sealing substrate also plays a role of protecting the sealing resin.

When a voltage of 3 V was applied between the electrodes of the EC devices of this Example, and when the coloring and loss of color were repeated such that the optical density change $\Delta OD$ is 1.0, none of the film breakage of EC device, the peeling off of the sealing resin and the sealing substrate, and the deterioration of external appearance was observed after 500 thousand repetition. The optical density change $\Delta OD$ was determined after the repeated coloring and loss of color to obtain 1.0, which was the same as the initial value, and no deterioration in the device characteristics was observed. The optical density change $\Delta OD$ as referred to in the specification is determined by the equation of $\Delta OD = \log_{10}(T_o/T)$, where $T_o$ is a transmittance when colorless, and $T$ is a transmittance when colored.

EXAMPLE 2

An EC device was prepared by the same procedure as in Example 1 except that a silicone resin having 60 Kgf/cm² of Young's modulus was used in place of the sealing resin of Example 1. Similar to Example 1, a voltage of 3 V was applied between the transparent electrodes, and 500 thousand cycles of coloring and loss of color were repeated so as to obtain an optical density change $\Delta OD$ of 1.0. As a result, the film breakage of the EC device, the peeling off of the sealing resin and the sealing substrate did not occur, and the deterioration of external appearance, and the variation in optical density change ΔOD were not observed.

EXAMPLE 3

An EC device was prepared by the same procedure as in Example 1 except that an epoxy resin having 17 Kgf/cm$^2$ of Young's modulus was used in place of the sealing resin of Example 1. Similar to Examples 1 and 2, 3 V of a voltage was applied between the transparent electrodes, and 500 thousand cycles of coloring and loss of color were repeated so as to obtain 1.0 of an optical density change ΔOD. As a result, the film breakage of the EC device, the peeling off of the sealing resin and the sealing substrate did not occur, and the deterioration of external appearance, and the variation in optical density change ΔOD were not observed.

EXAMPLE 4

An EC device was prepared by the same procedure as in Example 1 except that the structure was four-layered one having no oxidative coloring EC layer. Similar to Examples 1 through 3, 3 V of a voltage was applied between the transparent electrodes, and 200 thousand cycles of coloring and loss of color were repeated so as to obtain 1.0 of an optical density change ΔOD. As a result, the film breakage of the EC device, the peeling off of the sealing resin and the sealing substrate did not occur, and the deterioration in external appearance, and the variation in optical density change ΔOD were not observed.

COMPARATIVE EXAMPLE 1

An EC device was prepared by the same procedure as in Example 1 except that the sealing resin of Example 1 was changed into an epoxy resin having 2000 to 3000 Kgf/cm$^2$ of Young's modulus, having poor elasticity, and being usually used for adhesion of optical parts having dimensional precision. Similar to Examples 1 through 4, 3 V of a voltage was applied between the transparent electrodes, and repeated cycles of coloring and loss of color were carried out so as to obtain 1.0 of an optical density change ΔOD. Then, after 20 to 50 cycles of coloring and loss of color, lots of bubbles appeared within the EC device, and the film breakage of the EC device and the peeling off of the sealing substrate occurred, deterioration in external appearance was observed, and the optical density change ΔOD was determined to be lowered to 0.1–0.4.

COMPARATIVE EXAMPLE 2

An EC device was prepared by the same procedure as in Example 1 except that the sealing resin of Example 1 was changed into a modified acrylate resin having 70 to 100 Kgf/cm$^2$ of Young's modulus. Similar to Examples 1 through 4, 3 V of a voltage was applied between the transparent electrodes, and repeated cycles of coloring and loss of color were carried out so as to obtain 1.0 of an optical density change ΔOD. Then, similar to Comparative Example 1, after 20 to 50 cycles of coloring and loss of color, bubbles appeared within the EC device, and deterioration in external appearance was observed, and optical density change ΔOD was determined to be lowered to 0.5–0.6.

COMPARATIVE EXAMPLE 3

An EC device was prepared by the same procedure as in Example 1 except that the sealing resin of Example 1 was changed into a silicone resin having 3 to 6 Kgf/cm$^2$ of Young's modulus. Similar to Examples 1 through 4, 3 V of a voltage was applied between the transparent electrodes, and repeated cycles of coloring and loss of color were carried out so as to obtain 1.0 of an optical density change ΔOD. The EC device was significantly deformed, and the functioning of the device for mounting in an optical path was impaired.

COMPARATIVE EXAMPLE 4

An EC device was prepared by the same procedure as in Example 4 except that the sealing resin of Example 4 was changed into a modified acrylate resin having 70 to 100 Kgf/cm$^2$ of Young's modulus. Similar to Examples 1 through 4, 3 V of a voltage was applied between the transparent electrodes, and repeated cycles of coloring and loss of color were given so as to obtain 1.0 of an optical density change ΔOD. Then, after 12 to 16 cycles of coloring and loss of color, lots of bubbles appeared within the EC device, and deterioration in external appearance (light scattering) was observed. When the optical density change ΔOD was measured, it was lowered to 0.5–0.6.

EXAMPLE 5

A glass substrate having an anti-reflection film provided on one surface was subjected to vacuum deposition of ITO on the other surface thereof under the conditions of a substrate temperature=300° C. and an O$_2$ partial pressure= 5×10$^2$ Pa to form a transparent electrode (transparent electroconductive layer) having a layer thickness of 150 nm as a first layer.

Next, the transparent electrode was subjected to vacuum deposition of tantalum pentoxide under the conditions of a substrate temperature=300° C. and an O$_2$ partial pressure= 3×10$^{-2}$ Pa to form a transparent ion conductive layer having a thickness of 300 nm as a second layer.

Next, the transparent ion conductive layer was treated by vacuum deposition of tungsten trioxide under the conditions of a substrate temperature=300° C. and an O$_2$ partial pressure=5×10$^{-2}$ Pa to form a reductive coloring EC layer having a thickness of 1000 nm as a third layer.

Subsequently, the reductive coloring EC layer was to deposition of ITO by high frequency ion plating under the conditions of a substrate temperature=300° C., an O$_2$ partial pressure=5×10$^{-2}$ Pa, and a high frequency power=150 W to form a transparent electrode (transparent conductive layer) having a layer thickness of 450 nm as a fourth layer. Thus, a four-layered structure EC device (before sealing) as shown in FIG. 2 were prepared.

Then, the reductive coloring EC layer was colored by applying a voltage between the transparent electrodes 2a and 2b of the four-layered structure EC device (before sealing) using the power source 9 with the transparent electrode 2b being used as a negative electrode. The voltage application was controlled such that a change in optical density within a range capable of reversible coloring and loss of color occurred (in this Example, the optical density change ΔOD, which is the amount of change in coloring concentration, was 1.6 or less). Specifically, the voltage application was controlled such that the coloring progressed at a constant speed (in this Example, 10 sec.) up to 1.2 of the optical density change ΔOD. As a result, water as the carrier precursor in the four-layered structure member 8 was ionized into H$^{30}$ and OH$^{31}$. Under the above mentioned colored state, the resin-sealing was conducted using a sealing substrate applied with a sealing resin. The sealing resin used was a modified acrylate resin having 60 Kgf/cm$^2$ of Young's modulus.

In a plurality of EC devices of this Example prepared in the above-described manner, a voltage was applied between the transparent electrodes 2a and 2b with the transparent electrode 2b being used as a positive electrode to induce an oxidation-reduction reaction to effect loss of color. Then, 3 V of a voltage was applied between the transparent electrodes to determine the coloring speed and speed of loss of color and the optical density change ΔOD. The result was that all the EC devices gave 6 sec. of coloring speed and speed of loss of color and 1.0 of an optical density change ΔOD, and that there was observed no difference in the coloring speed and speed of loss of color and the optical density change ΔOD after the sealing.

After repeating the coloring and loss of color cycles 200 thousand times, the EC devices of this Example showed no deterioration of characteristics, giving 6 sec. of the coloring speed and speed of loss of color and 1.0±0.1 of the optical density change ΔOD.

As a result, also in this Example, a plurality of EC devices could be obtained having uniform characteristics and having high durability and stable characteristics.

EXAMPLE 6

EC devices were prepared in the same procedure as in Example 5 except that the ionization of water as the carrier precursor in the four-layer structure member 8 into $H^{30}$ and $OH^-$ was conducted under a control of voltage application between the transparent electrodes such that the optical density change ΔOD became 1.2 at a constant speed (15 sec.) smaller than that in Example 5.

Thus prepared plural number of EC devices were evaluated as in the case of Example 5, and the result showed 6 sec. of coloring speed and speed of loss of color and 1.0 of an optical density change ΔOD for all the EC devices tested. There was observed no difference in the coloring speed and speed of loss of color and in the optical density change ΔOD after the sealing.

After repeating the coloring and loss of color cycles 200 thousand times, the EC devices of this Example showed no deterioration of characteristics giving 6 sec. of the coloring speed and speed of loss of color and 1.0±0.1 of the optical density change ΔOD.

As a result, also in this Example, a plurality of EC devices could be obtained having uniform characteristics and having high durability and stable characteristics as in the case of Example 5.

It should be noted that Examples 5 and 6 dealt with the EC devices of four-layered structure. Nevertheless, the procedure described in Examples 5 and 6 is effective for EC devices having other structure, and gives similar effect with regard to, e.g., an EC device with five-layered structure described in Example 1. The following is an example of that type of EC device.

EXAMPLE 7

A plurality of EC devices having five-layered structure were prepared in the same procedure as in Example 1, except that the same procedure as shown in Example 5 was adopted to ionize water as the carrier precursor in the five-layered structure member 8 into $H^{30}$ and $OH^{31}$ before the sealing.

The plurality of EC devices thus prepared in this Example were evaluated as in the case of Example 5, and the result showed 6 sec. of the coloring speed and speed of loss of color and 1.0 of the optical density change ΔOD for all the EC devices tested. There was observed no difference in the coloring speed and speed of loss of color and in the optical density change ΔOD after the sealing.

After repeating the coloring and loss of color cycles 500 thousand times, the EC devices of this Example showed no deterioration of characteristics giving 6 sec. of the coloring speed and speed of loss of color and 1.0±0.05 of the optical density change ΔOD. Furthermore, it was found that the repeated durability of these EC devices having five-layered structure was superior to the EC devices having four-layered structure.

As a result, also in this Example, like Example 5, a plurality of EC devices could be obtained having uniform characteristics and having high durability and stable characteristics.

Examples 5 through 7 proved that by ionizing an electrolyte while controlling the voltage applied between the transparent electrodes of the EC device in such a manner that the coloring speed and speed of loss of color and the optical density change show specified values before the sealing of the EC device, it is possible to control the characteristics such as coloring speed and speed of loss of color and optical density change ΔOD after the sealing.

COMPARATIVE EXAMPLE 5

EC devices were prepared by similar procedure with Example 5 except that water as the carrier precursor in the four-layered structure member 8 was not ionized to $H^{30}$ and $OH^{31}$ but the four-layered structure member was impregnated with water to about 30 vol. %, followed by resin-sealing.

The plurality of EC devices thus prepared in this Example were subjected to 3 V of a voltage application between the transparent electrodes 2a and 2b to determine the coloring speed and speed of loss of color and the optical density change ΔOD. As a result, the coloring speed that gave 1.0 of the optical density change ΔOD were different for each device, giving a dispersion ranging from 4 to 12 sec.

Repeat of coloring and loss of color cycles revealed that some devices showed less than 0.5 of the optical density change ΔOD after 600 cycles. Thus the devices were concluded not applicable to practical use.

As described above, according to the first aspect of the present invention, the film-expansion on an EC device induced by repeated coloring and discoloring is absorbed by a sealing resin so that the film breakage of EC device and the peeling off of the sealing resin and the sealing substrate are prevented, whereby the durability of EC device is significantly improved. In an EC device with five-layer structure, in order to allow the desired reactions to progress, the oxidative coloring EC layer, the transparent ion conductive layer, the reductive coloring EC layer and the like are necessary to be formed with good precision and reproducibility of properties and thickness of the respective layers. However, the first aspect of the present invention allows some latitude in the film-forming conditions, thereby increasing the productivity of EC devices.

According to the second aspect of the present invention, the difference in coloring speed and speed of loss of color and of optical density change for every EC device induced from a slight change in EC device manufacturing conditions can be eliminated, thus providing EC devices having uniform characteristics and having high durability and stable characteristics. In addition, by ionizing the carrier precursor while controling a voltage applied between the electrodes of the EC device such that the coloring speed and speed of loss of color and the optical density change show specified values before sealing the EC device, the characteristics such as coloring speed and speed of loss of color and optical density change after the sealing can be controlled. Particularly when water is used as the carrier precursor in the EC device, specific control of the sealing environment is not needed and any special equipment for injecting carrier precursor is not needed because a necessary amount of water can be supplied from outside air into the EC device independently of the humidity change in outside air and stored in an ionized state. Thus the productivity of EC devices can significantly be increased.

When the first aspect and the second aspect of the invention are simultaneously applied, more excellent EC devices can be obtained.

The invention may be embodied in other specific forms without departing from the spirit or essential characteristics thereof. The present embodiments and examples are therefore to be considered in all respects as illustrative and not restrictive, the scope of the invention being indicated by the appended claims rather than by foregoing description and all changes which come within the meaning and range of equivalency of the claims are therefore intended to be embraced therein.

What is claimed is:

1. An electrochromic device comprising a pair of transparent substrates facing each other, a pair of transparent electrodes facing each other between said pair of transparent substrates, and an electrochromic layer and a transparent ion conductive layer sandwiched by said pair of transparent electrodes, wherein at least said electrochromic layer and said transparent ion conductive layer are coated with a resin having a Young's modulus of 8–60 Kgf/cm$^2$.

2. An electrochromic device according to claim 1, wherein said resin comprises a silicone resin, an urethane resin, a modified acrylate resin, or an epoxy resin.

3. An electrochromic device comprising a pair of transparent substrates facing each other, a pair of transparent electrodes facing each other between said pair of transparent substrates, and an electrochromic layer and a transparent ion conductive layer sandwiched by said pair of transparent electrodes, wherein at least said electrochromic layer and said transparent ion conductive layer are coated with a resin in a state that a carrier precursor in said electrochromic layer and in said transparent ion conductive layer is ionized.

4. An electrochromic device according to claim 3, wherein said carrier precursor comprises at least one selected from the group consisting of H$_2$O, LiI, Li$_3$N, and Li$_2$WO$_4$.

5. An electrochromic device according to claim 3, wherein said carrier precursor is water.

6. A method for manufacturing an electrochromic device comprising a pair of transparent substrates facing each other, a pair of transparent electrodes facing each other between said pair of transparent substrates, and an electrochromic layer and a transparent ion conductive layer sandwiched by said pair of transparent electrodes, the method comprising coating at least said electrochromic layer and said transparent ion conductive layer with a resin having a Young's modulus of 8–60 Kgf/cm$^2$.

7. A method for manufacturing an electrochromic device comprising a pair of transparent substrates facing each other, a pair of transparent electrodes facing each other between said pair of transparent substrates, and an electrochromic layer and a transparent ion conductive layer sandwiched by said pair of transparent electrodes, the method comprising coating at least said electrochromic layer and said transparent ion conductive layer with a resin in a state that a carrier precursor in said electrochromic layer and in said transparent ion conductive layer is ionized.

8. A method for manufacturing an electrochromic device according to claim 7, wherein, in ionizing said carrier precursor, a voltage is applied between said pair of transparent electrodes within such a voltage range as to induce coloring and loss of color of said electrochromic device in a reversible manner.

9. A method for manufacturing an electrochromic device according to claim 8, wherein the voltage applied between said pair of transparent electrodes in ionizing said carrier precursor is a voltage that colors said electrochromic device at a specified coloring speed.

10. A method for manufacturing an electrochromic device according to claim 7, wherein said carrier precursor comprises at least one selected from the group consisting of H$_2$O, LiI, Li$_3$N, and Li$_2$WO$_4$.

11. A method for manufacturing an electrochromic device according to claim 7, wherein said carrier precursor is water.

* * * * *

UNITED STATES PATENT AND TRADEMARK OFFICE
CERTIFICATE OF CORRECTION

PATENT NO. : 5,777,780

DATED : July 7, 1998

INVENTOR(S): JUNJI TERADA ET AL.

It is certified that error appears in the above-identified patent and that said Letters Patent is hereby corrected as shown below:

COLUMN 2

Line 2, "$2nOH^{31} \rightarrow nH_2O + (½)nO_2\uparrow + 2ne^{31}$" should read
-- $2nOH^- \rightarrow nH_2O + (½)nO_2\uparrow + 2ne^-$ --;

Line 7, "$2nH^+ + 2ne^- \uparrow nH_2\uparrow$" should read
-- $2nH^+ + 2ne^- \rightarrow nH_2\uparrow$ --;

Line 20, "$Ir(OH)_x$" should read --$Ir(OH)_x \rightarrow$--;

Line 37, "$OH^{31}$" should read --$OH^-$--.

COLUMN 10

Line 27, "$5 \times 10^2$" should read --$5 \times 10^{-2}$--;

Line 63, "$H^{30}$ and $OH^{31}$." should read --$H^+$ and $OH^-$.--

COLUMN 11

Line 26, "$H^{30}$" should read --$H^+$--;

Line 62, "$H^{30}$ and $OH^{31}$" should read --$H^+$ and $OH^-$--.

UNITED STATES PATENT AND TRADEMARK OFFICE
CERTIFICATE OF CORRECTION

PATENT NO. : 5,777,780

DATED : July 7, 1998

INVENTOR(S): JUNJI TERADA ET AL.

It is certified that error appears in the above-identified patent and that said Letters Patent is hereby corrected as shown below:

COLUMN 12

Line 28, "$H^{30}$" should read --$H^+$--;

Line 29, "$OH^{31}$" should read --$OH^-$--.

Signed and Sealed this

Twenty-second Day of June, 1999

Q. TODD DICKINSON

*Attest:*

*Attesting Officer*     *Acting Commissioner of Patents and Trademarks*